US008672298B2

(12) United States Patent
Hsieh

(10) Patent No.: US 8,672,298 B2
(45) Date of Patent: Mar. 18, 2014

(54) JACK FOR TRAILER

(76) Inventor: Wu-Chih Hsieh, Taichung (TW)

(*) Notice: Subject to any disclaimer, the term of this patent is extended or adjusted under 35 U.S.C. 154(b) by 288 days.

(21) Appl. No.: 13/317,104

(22) Filed: Oct. 11, 2011

(65) Prior Publication Data

US 2013/0087749 A1 Apr. 11, 2013

(51) Int. Cl.
*B66F 5/00* (2006.01)
(52) U.S. Cl.
USPC .......................................... 254/418; 254/425
(58) Field of Classification Search
USPC .................... 254/100, 134, 418–425
See application file for complete search history.

(56) References Cited

U.S. PATENT DOCUMENTS

| 2,882,070 | A | * | 4/1959 | Bill ............................... 280/475 |
| 4,635,904 | A | * | 1/1987 | Whittingham ................ 254/425 |
| 5,067,692 | A | * | 11/1991 | Nudd et al. .................... 254/420 |
| 5,711,504 | A | * | 1/1998 | Cusimano .................. 248/354.3 |
| 5,711,512 | A | * | 1/1998 | Kauffman ...................... 254/2 B |
| 6,607,183 | B1 | * | 8/2003 | White et al. .................. 254/420 |
| 7,547,044 | B2 | * | 6/2009 | Cokeley ......................... 280/755 |
| RE43,535 | E | * | 7/2012 | Roll .............................. 254/425 |
| 2002/0180198 | A1 | * | 12/2002 | Schubert et al. ............ 280/763.1 |
| 2013/0087749 | A1 | * | 4/2013 | Hsieh ............................ 254/100 |

* cited by examiner

*Primary Examiner* — Lee D Wilson

(57) ABSTRACT

A jack includes an outer tube, an inner tube and a lifting device. The outer tube has a positioning member and a driving rod connected thereto. The positioning member is positioned by an object and the driving rod is driven by a crank. The inner tube is located in the outer tube and the lifting device is located on the top of the inner tube so as to lift the outer tube. The positioning member is located on the top of the outer tube and the driving rod is located below the positioning member. The positioning member is positioned by a pivotal device which pivots the positioning member to a desired angle and positions the positioning member.

7 Claims, 9 Drawing Sheets

JACK FOR TRAILER

BACKGROUND OF THE INVENTION

1. Field of the Invention

The present invention relates to a jack, and more particularly, to a jack for trailers and the jack occupies less space and can be pivoted to desired angle.

2. Background of the Invention

A conventional trailer is connected to a vehicle so as to carry a storage trailer or a yacht with the vehicle. When parking, the trailer needs to be lifted a distance and an A-shaped frame is lifted by using a jack as shown in FIG. 1. The conventional jack 1 generally includes an outer tube 2, an inner tube 3, a clamp 4, a lifting device (not shown) and a crank 5. The inner tube 3 is received in the outer tube 2 and the outer tube 2 has the lifting device. A wheel 6 or a stand is connected to the lower end of the outer tube 2. The clamp 4 is located at the mediate portion of the outer tube 2 and the crank 5 is rotated to drive the lifting device to move the outer tube 2.

When in use, the clamp 4 and a board clamp the handle, the outer tube 2 is moved upward by rotating the crank 5 so as to adjust the handle. The outer tube 2 and the inner tube 3 are rotated 90 degrees about the clamp 4 so as to retrieve the jack 1 to remove the wheel 6 from the ground and be located parallel to the handle. The wheel 6 assists the movement of the trailer and also lifts the handle to support the trailer.

The clamp 4 of the conventional jack 1 occupies too much space and is located at the middle of the outer tube 2 so that the jack 1 becomes too bulky to be stored or transportation.

The clamp 4 of the conventional jack 1 can only be rotated 90 degrees and which is not convenient for folding the jack 1. Not all of the handles of the conventional trailers can be rotated 90 degrees to fold the jack 1, because of the shape of the handle, the jack 1 can only be rotated to a certain angle so that the clamp 4 of the conventional jack 1 cannot be used for all of the handles of the trailers.

The crank 5 of the conventional jack 1 is located at the top end thereof (the crank in FIG. 1 is located on the side of the top end), so that when rotating the crank 5, it may be stopped by the objects located beside the handle.

SUMMARY OF THE INVENTION

The present invention relates to a jack and comprises an outer tube which is a hollow tube and a positioning member and a driving rod are respectively connected to the outer tube. The positioning member is positioned by an object and the driving rod is driven by a crank. An inner tube is located in the outer tube and a stand is connected to the lower end of the inner tube. A lifting device is located on the top of the inner tube so as to lift the outer tube. The positioning member is located on the top of the outer tube and the driving rod is located below the positioning member. The positioning member is positioned by a pivotal device which pivots the positioning member to a desired angle.

The primary object of the present invention is to provide a jack which occupies less space and the positioning member is located at the top of the jack so that only limited space is needed to store or transport the jack.

Another object of the present invention is to provide a jack which can be rotated to any desired angle so that the jack can be easily stored and can be cooperated with all handles of the existed jacks.

Yet another object of the present invention is to provide a jack wherein the driving rod is located on outside of the outer tube so that when rotating the crank, the crank is not stopped by object located beside the handle of the trailer.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
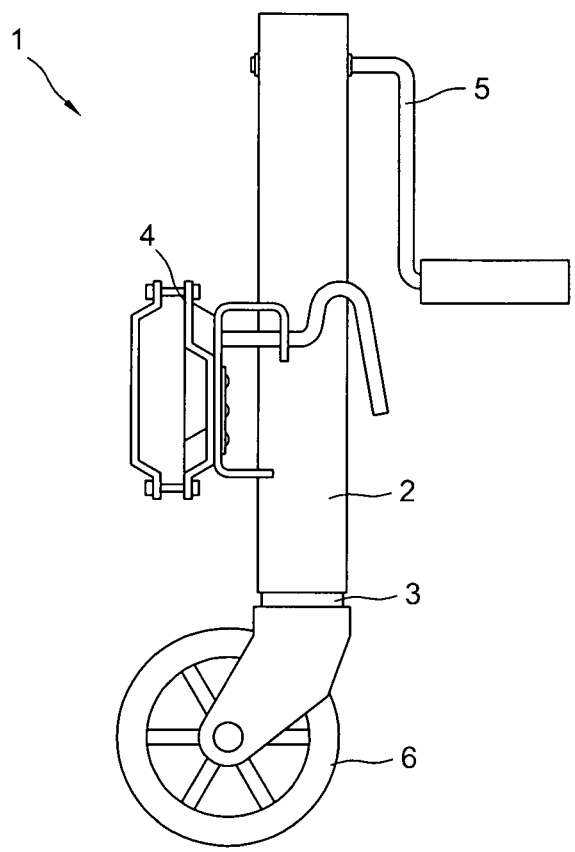
FIG. 1 is a conventional jack for trailers.
Figure 2:
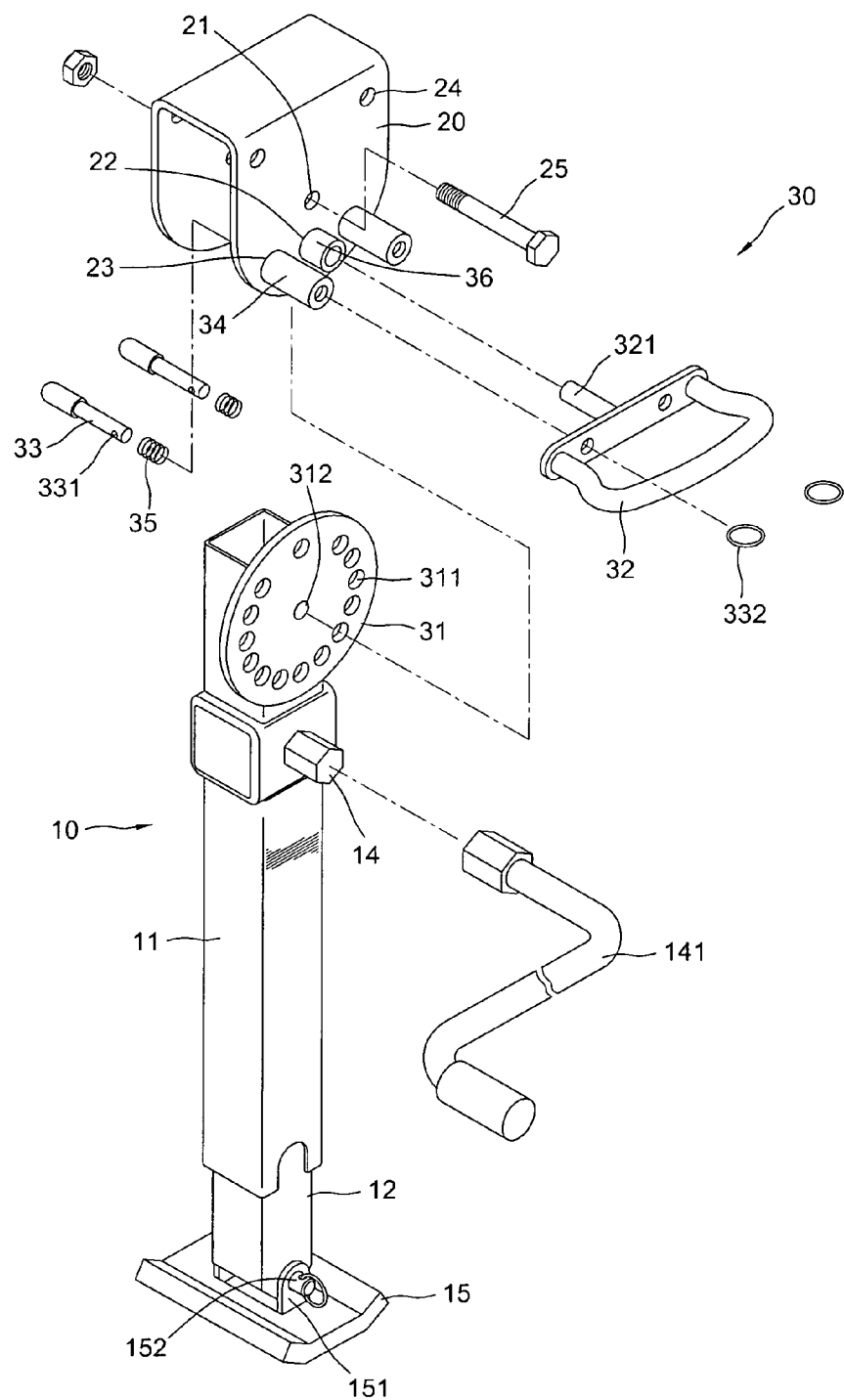
FIG. 2 is an exploded view to show the jack of the present invention.
Figure 3:
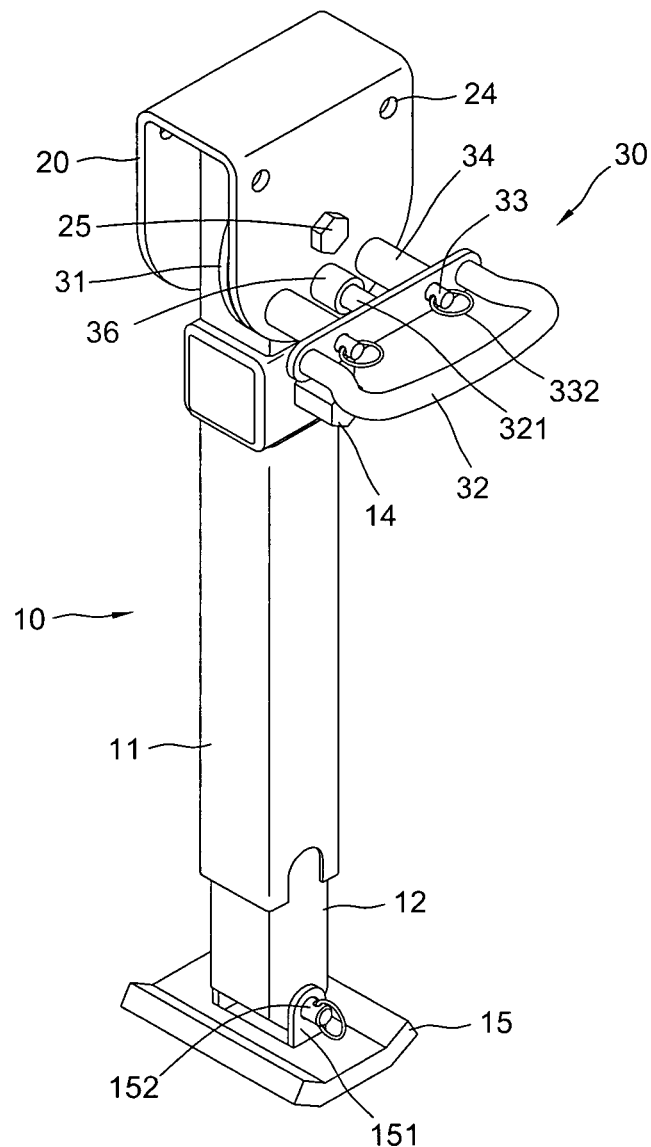
FIG. 3 is a perspective view to show the jack of the present invention.
Figure 4:
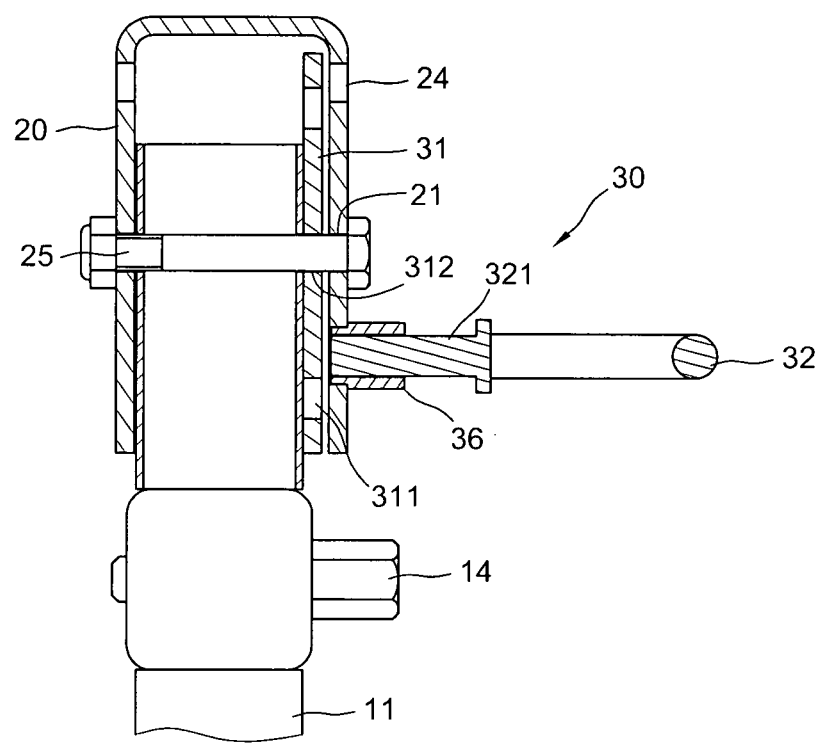
FIG. 4 is a cross sectional view of the jack of the present invention.
Figure 5:
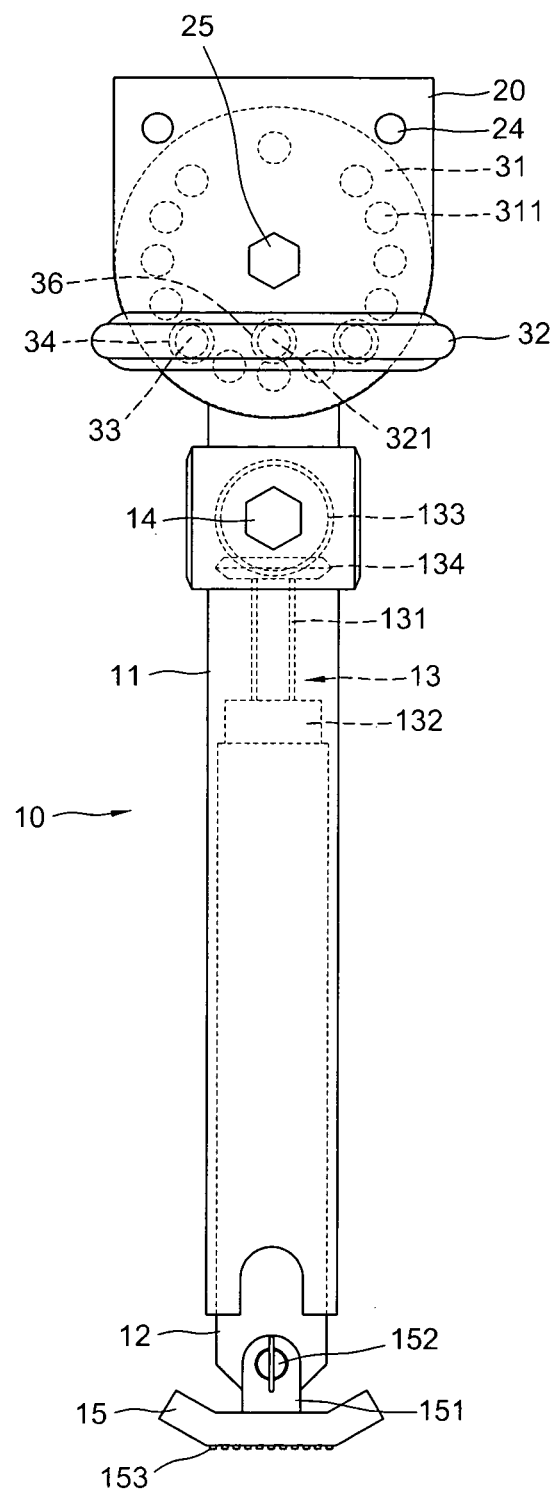
FIG. 5 is a plane view of the jack of the present invention.
Figure 6:
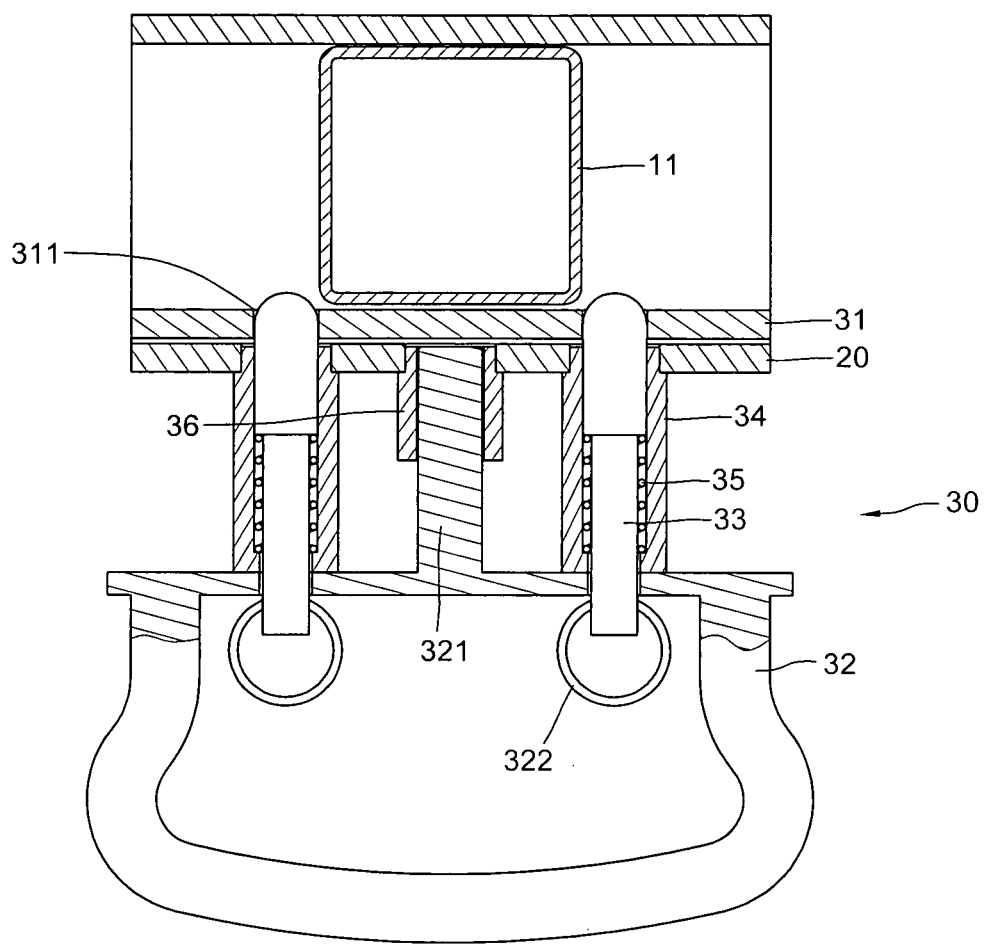
FIG. 6 shows the operation of the positioning member of the jack of the present invention.
Figure 7:
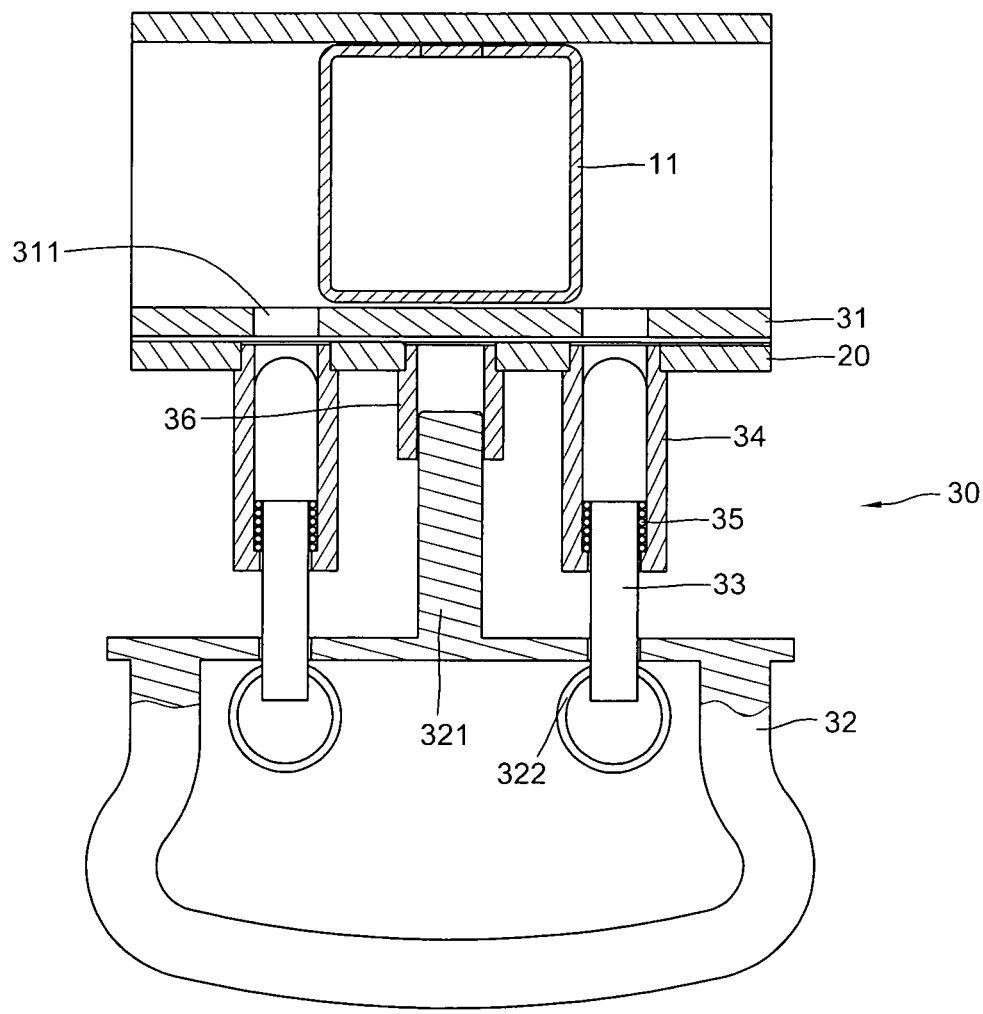
FIG. 7 shows that the insertion rods of the positioning member are disengaged from the insertion holes.
Figure 8:
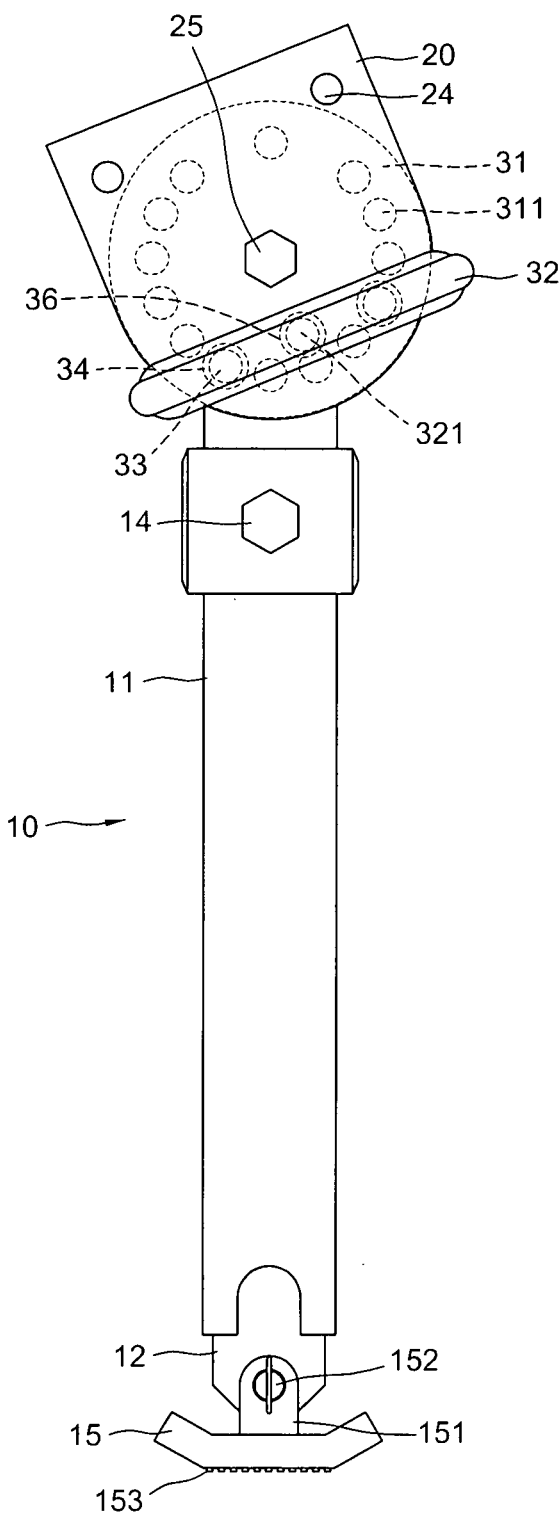
FIG. 8 shows that the positioning member is pivoted an angel.

Referring to FIGS. 2 to 8, the jack 10 of the present invention comprises an outer tube 11, an inner tube 12 and a lifting device 13 (FIG. 5). The outer tube 11 is a hollow tube and a positioning member 20 and a driving rod 14 are respectively connected to the outer tube 11. The positioning member 20 is positioned by an object and the driving rod 14 is driven by a crank 141. The positioning member 20 is located on the top of the outer tube 11 and the driving rod 14 is located below the positioning member 20. The positioning member 20 is positioned by a pivotal device 30 which pivots and positions the positioning member 20. The positioning member 20 is a U-shaped member and has a pivotal hole 21, multiple insertion holes 22, 23 and clamp holes 24. A bolt 25 extends through the pivotal hole 21, the insertion holes 22, 23 are located beneath the pivotal hole 21, and the clamp hole 24 is located above the pivotal hole 21. The pivotal device 30 has a disk 31 and a handle 32, the disk 31 is fixed to outside of the outer tube 11 and has a central hole 312 and multiple positioning holes 311 are located around the central hole 312. The handle 32 is connected to the positioning member 20 by inserting a positioning protrusion 321 into the insertion hole 22. Multiple insertion rods 33 are inserted into the insertion holes 23. Each of the insertion rods 33 of the handle 32 is connected to a connection tube 34. The insertion rods 33 each have a through hole 331 which has a ring 332 connected thereto which protrudes from the connection tube 34. A resilient member 35 is mounted to the insertion rod 33 so that the insertion rod 33 can be returned after the resilient member 35 is compressed. The insertion rods 33 can be disengaged from the positioning holes 311 of the disk 31 by pulling the handle 32 and the rings 332. The positioning protrusion 321 of the handle 32 has a socket 36 mounted thereto, and the socket 36 is fixed to one of the insertion holes 22 of the positioning member 20. The positioning member 20 is pivotably connected to the outer tube 11 by extending the bolt 25 through the pivotal hole 21 of the positioning member 20 and the central hole 312 of the disk 31. The disk 31 is fixed to the outer tube 11. The handle 32 can pivot the positioning member 20 an angle and the insertion rods 33 are inserted into the positioning holes 311 of the disk 31 to position the positioning member 20 at that angular position.

The inner tube 12 is movable located in the outer tube 11 and a stand 15 is connected to the lower end of the inner tube 12. The stand 15 has a board on which a lug 151 is connected, a pin 152 extends through the lug 151 to connect the lower end of the inner tube 12. The board has an anti-slip surface 153 (FIG. 5) on the underside thereof so as to contact the ground.

The lifting device 13 as shown in FIG. 5 is located on the top of the inner tube 12 so as to lift the outer tube 11 which is supported by the inner tube 12 and the stand 15. The lifting device 13 comprises a threaded rod 131, a nut 132, an active bevel gear 133 and a passive bevel gear 134. The active bevel gear 133 is located in the driving rod 14 and the nut 132 is located on the top of the inner tube 12 and is stationary. The threaded rod 131 threadedly extends through the nut 132 and the passive bevel gear 134 is fixed on the threaded rod 131 and is engaged with the active bevel gear 133. By rotating the driving rod 14, the active bevel gear 133 is co-rotated with the driving rod 14, the passive bevel gear 134 and the threaded rod 131 are rotated. Because the threaded rod 131 is connected with the nut 132, the threaded rod 131 is moved up and down to move the outer tube 11 move up and down.

When in use, the object on the trailer is supported by the positioning member 20 and other boards (not shown) are cooperated with the clamp holes 24 to clamp the object as shown in FIGS. 4 to 8. The handle 32 is pulled a distance and the inside of the handle 32 contacts the rings 332, the handle 32 is further pulled a distance, the rings 332 and the handle 32 are together pulled a distance. The rings 332 pull the insertion rods 33 which are disengaged from the positioning holes 311 of the disk 31. The handle 32 then pivots the positioning member 20 an angle and then the handle 32 is released. The rings 332, the insertion rods 33 are returned by the forces from the resilient members 35, the insertion rods 33 are then inserted into the positioning holes 311 again to position the positioning member 20 at the angular position to support the object. The crank 141 (FIG. 2) is then rotated to rotate the driving rod 14 which drives the active bevel gear 133 so as to rotate the passive bevel gear 134 and the threaded rod 131. The threaded rod 131 cooperated with the nut 132 then moves up and down to adjust the outer tube 11 to move up and down. The positioning member 20 moves up and down to support the object at a height.

The improvements of the present invention is that the positioning member 20 is located on the top of the outer tube 11, instead of the mediate portion as the conventional jack, and the driving rod 14 is located beneath the positioning member 20, and the positioning member 20 can be pivoted to a desired angle by the pivotal device 30.

The positioning member 20 of the present invention occupies less space and is located at the top of the outer tube 11 so that only limited space is needed to store or transport the jack.

The positioning member 20 of the present invention can be pivoted to any desired angle and which is convenient when folding the jack 10. The handle of the trailer that is clamped by the positioning member 20 can fold and position the jack 10 at a proper angle so that the jack can be used with any conventional handles of the trailers.

The driving rod 14 is located on outside of the outer tube 11 so that when rotating the crank 141, the crank 141 is not stopped by object located beside the handle of the trailer.

The stand 15 is easily assembled, installed, and replaced.

Figure 9:
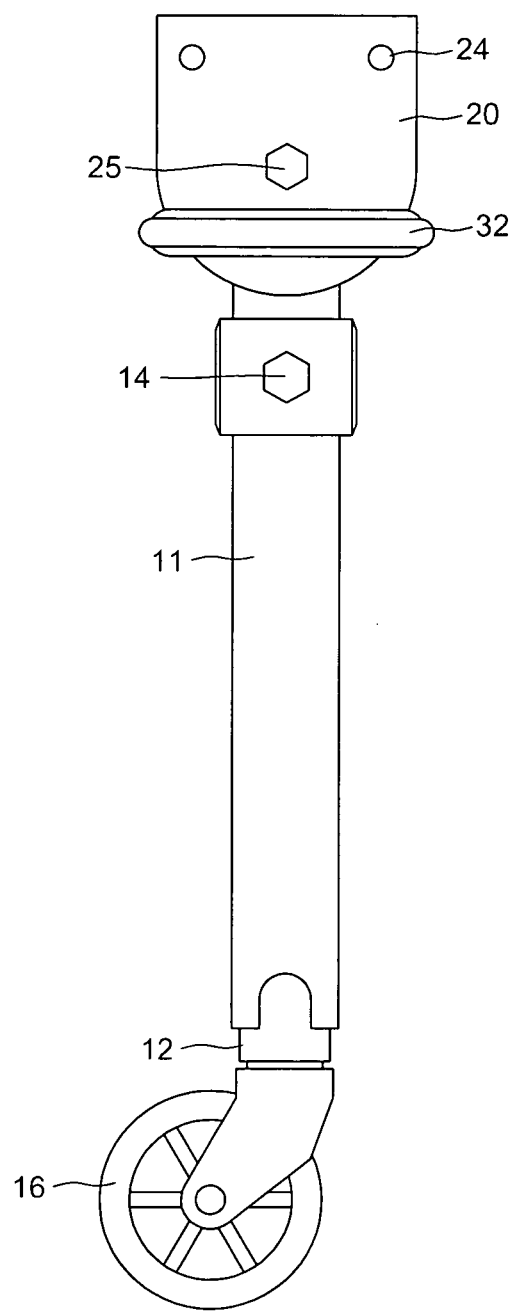
FIG. 9 shows a second embodiment of the jack of the present invention.

FIG. 9 shows the second embodiment, wherein the stand 15 connected to the lower end of the inner tube 12 is a wheel 16.

While we have shown and described the embodiment in accordance with the present invention, it should be clear to those skilled in the art that further embodiments may be made without departing from the scope of the present invention.

What is claimed is:

1. A jack comprising:

an outer tube being a hollow tube and a positioning member and a driving rod respectively connected to the outer tube, the positioning member being positioned by an object and the driving rod being driven by a crank;

an inner tube located in the outer tube and a stand connected to a lower end of the inner tube;

a lifting device located on a top of the inner tube so as to lift the outer tube, and the positioning member located on a top of the outer tube and the driving rod located below the positioning member, the positioning member being positioned by a pivotal device which pivots the positioning member, the positioning member being a U-shaped member and having a pivotal hole, multiple insertion holes and clamp holes, the pivotal device having a disk and a handle, the disk having a central hole and multiple positioning holes being located around the central hole, the handle connected to the disk by inserting a positioning protrusion into the insertion hole, multiple insertion rods inserted into the insertion holes, a bolt extending into the pivotal hole of the positioning member and the central hole of the disk so that the positioning member is pivotably connected to the outer tube, the disk being fixed to the outer tube.

2. The jack as claimed in claim 1, wherein each of the insertion rods of the handle is connected to a connection tube, the insertion rods each have a through hole which has a ring connected thereto which protrudes from the connection tube, a resilient member is mounted to the insertion rod.

3. The jack as claimed in claim 1, wherein the positioning protrusion of the handle has a socket mounted thereto.

4. The jack as claimed in claim 1, wherein the lifting device comprises a threaded rod, a nut, an active bevel gear and a passive bevel gear, the active bevel gear is located in the driving rod and the nut is located on the top of the inner tube, the threaded rod threadedly extends through the nut, the passive bevel gear on the threaded rod is engaged with the active bevel gear.

5. The jack as claimed in claim 1, wherein the stand has a board on which a lug is connected, a pin extends through the lug to connect the lower end of the inner tube.

6. The jack as claimed in claim 5, wherein the board has an anti-slip surface on an underside thereof.

7. The jack as claimed in claim 1, wherein the stand connected to the lower end of the inner tube is a wheel.

\* \* \* \* \*